United States Patent Office 3,443,619
Patented May 13, 1969

3,443,619
PNEUMATIC TIRE COMPOSITIONS COMPRISING ETHYLENE / PROPYLENE / DICYCLOPENTADIENE TERPOLYMER RUBBER
Robert W. Kindle, Cheshire, Conn., assignor to Uniroyal, Inc., a corporation of New Jersey
Filed Mar. 4, 1966, Ser. No. 531,726
Int. Cl. C08c 9/14; C08d 9/08
U.S. Cl. 152—330         2 Claims

ABSTRACT OF THE DISCLOSURE

White sidewalls for pneumatic tires that are highly resistant to cracking are made from a blend of EPDM in which the diene is dicyclopentadiene, and another elastomer (natural rubber or butadiene-styrene copolymer). Polychloroprene and chlorosulfonated polyethylene may also be included in the composition. The compositions are also useful as coverstrips or black sidewalls.

---

This invention relates to new compositions useful in pneumatic tires, and more particularly it relates to blends of an unsaturated rubbery terpolymer of at least two different alpha-monoolefins and dicyclopentadiene with another elastomer. The invention is particularly concerned with the use of such blends in tire sidewalls, particularly as white sidewalls or coverstrips for sidewalls.

In the manufacture of pneumatic tires a particular problem arises in providing a sidewall composition which will resist cracking under the influence of such factors as outdoor exposure, especially in an atmosphere containing appreciable ozone, and especially under the conditions of dynamic flexing to which tire sidewalls are subject in use. To provide improved resistance to cracking, and at the same time good resistance to abrasion, and good adhesion to the underlying parts of the tire, has proven to be a particularly difficult problem.

The invention will be described with reference to the accompanying drawings, wherein:

FIG. 1 includes a photograph of test specimens of pneumatic tire white sidewall compositions after subjecting to an outdoor dynamic flexing test;

FIG. 2 includes a similar photograph of test specimens of sidewall coverstrip compositions; and, FIG. 3 is a diagrammatic sectional view of a pneumatic tire embodying a white sidewall and coverstrip of the invention.

The invention is based on the discovery that unsaturated ethylene - propylene - diene elastomer, known as EPDM, in which the diene is dicyclopentadiene, is capable of providing, when blended with other elastomers, new white sidewall and coverstrip compositions which are remarkably resistant to ozone-cracking, in addition to providing other qualities desirable in white sidewall and coverstrip compositions. The improved results realized by the invention are not obtainable with EPDM in which the diene is other than dicyclopentadiene; for example, EPDM in which the third monomer is 1,4-hexadiene, or EPDM in which the third monomer is methylene norborene, does not provide a blend which resists ozone cracking. Thus, EPDM in which the third monomer is dicyclopentadiene has been found to be essential, for the purpose of providing an elastomer blend which has exceptional resistance to ozone cracking.

In the article entitled, "Blends of Royalene With Other Rubbers," M. S. Sutton, Rubber World, February 1964, pp. 62–68, blends of ethylene-propylene terpolymer with other rubbers are disclosed but no white sidewall or coverstrip compositions are disclosed, and in particular no information is disclosed which would lead one skilled in the art to suspect that the present white sidewall and coverstrip compositions based on EPDM in which the third monomer is dicyclopentadiene would provide results, especially from the standpoint of ozone resistance, resistance to cracking, and adequate adhesion to other tire surfaces, not attainable with otherwise similar compositions based on EPDM in which the third monomer is 1,4-hexadiene or methylene norbornene for example.

Typical white sidewall compositions of the invention are comprised of an elastomeric blend containing, in 100 parts by weight of elastomers, from 15 to 35 parts of EPDM based on dicyclopentadiene and correspondingly from 85 to 65 parts of another elastomer, ordinarily a conjugated diene polymer rubber, whether a homopolymer rubber such as polyisoprene (natural rubber or synthetic polyisoprene) or polybutadiene (solution polymerized or emulsion polymerized), or a copolymer containing a major proportion of a conjugated diene, such as copolymers of butadiene with styrene, acrylonitrile, vinylpyridine, and similar copolymerizable monoethylenically unsaturated monomers alone or in admixture.

In another form of the invention, the white sidewall composition comprises, in 100 parts of elastomers, 10 to 30 parts of EPDM based on dicyclopentadiene, 10 to 30 parts of polychloroprene rubber, 10 to 30 parts of chlorosulfonated polyethylene elastomer, and from 30 to 70 parts of another elastomer which is a conjugated diene polymer rubber as previously described.

These white sidewall compositions are of course devoid of carbon black and may of course contain the various compounding ingredients conventional in white sidewall compositions, notably vulcanizing agents such as sulfur or sulfur-yielding curatives, accelerators, plasticizers or processing aids, white pigments such as zinc oxide, silica, or titanium dioxide, and the like. So great is the resistance of the composition to aging, including the adverse effects of ozone, that it is not necessary to add any of the additional organic antiozonants such as are required in conventional sidewall and coverstrip compositions. The present composition devoid of added organic antiozonant (of course, the elastomers employed may contain small residual quantities of the stabilizers conventionally added to the polymers during manufacture) is in this respect economical, and avoids the difficulties with staining so frequently encountered in conventional compositions.

Typical coverstrip compositions of the invention are comprised of an elastomeric blend containing, in 100 parts by weight of elastomers, from 15 to 35 parts of EPDM based on dicyclopentadiene, from 15 to 35 parts of polychloroprene rubber, and from 40 to 60 parts of another elastomer, ordinarily a conjugated diene elastomer as described above in connection with the white sidewall composition. The coverstrip composition is further distinguished by containing 20 to 30 parts of carbon black (per 100 parts by weight of total elastomers). Again, the coverstrip composition further contains other conventional compounding ingredients, notably vulcanizing agents such as sulfur or sulfur-yielding curatives, accelerators, plasticizers or processing aids etc. Like the above-described white sidewall stock, the present coverstrip stock, even through devoid of the usual added organic antizonant (although of course, some residue of stabilizer added in the manufacture of the polymers may be present), is nevertheless remarkably resistant to ozone cracking and other forms of aging.

The particular EPDM employed in the invention is, as indicated, a critical factor. Broadly, it may be defined as an unsaturated, sulfur-vulcanizable terpolymer of at least two different alpha-monoolefins (usually ethylene and propylene, although other pairs of alpha-monoolefins may be used) with dicyclopentadiene as the third monomer to confer unsaturation and sulfur-vulcanizability. The criticality of the use of the dicyclopentadiene-EPDM is emphasized by the fact that EPDM's in which the third monomer is other than dicyclopentadiene, for example EPDM in which the third monomer is 1,4-hexadiene or EPDM in which the third monomer is methylene norbornene, give unsatisfactory results as will be demonstarted in the examples below. For purposes of the invention the EPDM employed contains from 45 to 70% combined ethylene, from 30 to 55% combined propylene, and from 2 to 12.5% of combined dicyclopentadiene (corresponding to an iodine number of 4 to 25).

The EPDM employed frequently has a viscosity within the range 25 to 120 ML-4-212° F.

The EPDM employed may be oil-extended, with for example 15 to 100 or more parts, per 100 parts of EPDM, of a non-staining oil.

The compositions of the invention may be prepared in the conventional manner using the usual rubber mixing and shaping machinery. The compounded stocks, suitably in the form of extruded or calendered strips of appropriate size, are applied to the raw tire carcass, conveniently while the carcass is supported on the usual tire building drum, after which the tire is shaped and cured in a mold under conventional conditions. It will be understood that the white sidewall composition is conventionally applied directly to the carcass, while the coverstrip is laid over the white sidewall stock. In the type of pnematic tire having a relatively narrow white sidewall band the coverstrip usually covers the entire sidewall, and after cure of the tire a band of coverstrip of a desired width is ground away, exposing a band of white stock. If it is desired to make a tire having a wide whitewall, it is usual to apply only a relatively narrow coverstrip overlapping only a marginal portion of the white stock at the junction between the white stock and the black tread stock. After cure of the tire, some of the coverstrip stock overlapping the white is ground away to provide a clean, even junction between the white and the black.

Referring to the drawing, and particularly to FIG. 3, the embodiment of the invention shown comprises a tire having a fabric-reinforced carcass 10 (the fabric of course being coated with conventional carcass stock) with superimposed tread 11 and a black sidewall 12 of conventional composition on one side. On the other side there is a layer of white sidewall stock 13 of the invention mostly covered by a coverstrip stock 14 of the invention, except for a relatively narrow zone 15 where the coverstrip stock has been ground away to expose a band of the white stock.

The tread, carcass, and black sidewall stocks may be compounded in accordance with conventional practice, and are usually based on highly unsaturated conjugated diene elastomers, notably butadiene-styrene copolymer, polyisoprene (natural or synthetic) or polybutadiene (solution or emulsion).

The following examples, in which all parts are expressed by weight, will serve to illustrate the invention in more detail.

Example 1

A series of four different white sidewall stocks are prepared, based on natural rubber alone, or natural rubber in admixture with three different EPDM's, as shown in Table 1, below. Stock 1-A, based on natural rubber alone, is included as a control. Stock 1-B, based on natural rubber plus EPDM made with dicyclopentadiene as the third monomer, represents the invention. Stock 1-C and 1-D, based on natural rubber plus EPDM's made with 1,4-hexadiene or methylene norbornene, respectively, are outside the invention and are included for purposes of comparison. The dicyclopentadiene EPDM employed in this example contains 62% ethylene, 33% propylene and 5% dicyclopentadiene (iodine number 10); it has a Mooney viscosity of 53 ML-4-212° F. The 1,4-hexadiene EPDM employed contains approximately 46% ethylene, 47% propylene and 7% 1,4-hexadiene (iodine number 12); it has a Mooney viscosity of 82 ML-4-212° F. The methylene norbornene EPDM employed contains approximately 55% ethylene, 42.5% propylene and 2.5% methylene norbornene (iodine number 6); it has a Mooney viscosity of 90 ML-4-212° F. Molded specimens of the stocks are cured for 30 minutes at 320° F., and then subjected to an outdoor dynamic flexing test at Naugatuck, Connecticut, as well as an ozone box test (at 12.5% elongation; ozone concentration 50 parts per hundred million; total exposure 636 hours), and also an outdoor static aging test at Naugatuck, Conn. (29 days total), with the results shown in Table 1. In the table, VVS stands for very very slight cracking, VS stands for very slight cracking, S stands for slight cracking and C stands for cracked; OK signifies no cracks.

TABLE 1

White Sidewalls

|  | 1-A | 1-B | 1-C | 1-D |
| --- | --- | --- | --- | --- |
| Natural Rubber | 100.00 | 80.00 | 80.00 | 80.00 |
| Dicyclopentadiene EPDM |  | 20.00 |  |  |
| 1,4-hexadiene EPDM |  |  | 20.00 |  |
| Methylene Norbornene EPDM |  |  |  | 20.00 |
| Titanium Dioxide | 35.00 | 35.00 | 35.00 | 35.00 |
| Zinc Oxide | 35.00 | 35.00 | 35.00 | 35.00 |
| Stearic Acid | 2.00 | 2.00 | 2.00 | 2.00 |
| Light Processing Oil | 5.00 | 5.00 | 5.00 | 5.00 |
| Wax | 5.00 | 5.00 | 5.00 | 5.00 |
| N-cyclohexyl-2-benzothiazole Sulfenamide | 0.35 | 0.35 | 0.35 | 0.35 |
| Sulfur | 3.50 | 3.50 | 3.50 | 3.50 |
| Outdoor Dynamic Flexing (Kilocycles) | | | | |
| VVS |  | 774 | 1,671 | 1,671 | 1,671 |
| VS | 1,671 |  | 1,913 |  |
| S |  |  |  |  |
| C | 1,913 |  |  | 1,913 |
| Condition at 2,000 Kc | C | VVS | VS | C |
| Ozone Box (Hours) | | | | |
| VVS |  | 4 |  | 4 | 8 |
| VS |  |  | 8 | 18 |
| S |  |  | 18 |  |
| C |  |  | 180 |  |
| Condition at 636 Hours | VVS | OK | C | VS |
| Outdoor Static Exposure (Days) | | | | |
| VVS |  |  |  |  |
| VS |  |  |  |  |
| S |  |  |  |  |
| C | 29 |  |  |  |
| Condition at 29 Days | C | OK | OK | OK |

It will be seen by inspection of Table 1, and by examination of FIG. 1 wherein a photograph of the dynamic flexing samples after 2000 kilocycles is shown, that the dicyclopentadiene EPDM stock 1-B has only a slight cracking condition while the other EPDM stocks 1-C and 1-D crack almost as badly as the control stock, 1-A. Since the sidewall area of tires is under constant dynamic flexing and strain, great emphasis must be placed on the dynamic test data. This test has correlated well with actual experience with the invention in tires.

Example 2

A series of four different coverstrip stocks are prepared, based on natural rubber alone plus neoprene, or natural rubber/neoprene plus three different EPMDs as shown in Table 2, below. Stock 2-A, based on natural rubber-neoprene, is included as a control. Stock 2-B, based on natural rubber, neoprene and EPDM made with dicyclopentadiene, represents the invention. Stocks 2-C and 2-D, based on natural rubber-neoprene plus EPDMs made with 1,4-hexadiene or methylene norbornene, respectively, are outside the invention and are included for purposes of comparison. The dicyclopentadiene EPDM, the 1,4-hexadiene EPDM, and the methylene norbornene EPDM, are the same as indicated in Example 1. The formulations and test results on specimens cured for 30 minutes at 320° F. are as shown in Table 2, for an outdoor dynamic flexing test at Naugatuck, Conn. (3500 kilocycles total), an ozone box test (50 parts per hundred million of ozone; 12.5% elongation, total exposure 816 hours), and an outdoor static test at Naugatuck, Conn. (26 days total).

TABLE 2

Coverstrip

|  | 2-A | 2-B | 2-C | 2-D |
|---|---|---|---|---|
| Natural Rubber | 50.00 | 50.10 | 50.00 | 50.00 |
| Dicyclopentadiene EPDM |  | 20.00 |  |  |
| 1,4-hexadiene EPDM |  |  | 20.00 |  |
| Methylene Norbornene EPDM |  |  |  | 20.00 |
| Neoprene | 50.00 | 30.00 | 30.00 | 30.00 |
| Carbon Black (FEF) | 25.00 | 25.00 | 25.00 | 25.00 |
| Zinc Oxide | 3.50 | 3.50 | 3.50 | 3.50 |
| Stearic Acid | 2.00 | 2.00 | 2.00 | 2.00 |
| Light Processing Oil | 3.00 | 3.00 | 3.00 | 3.00 |
| 2-benzothiazyl Disulfide | 0.50 | 0.50 | 0.50 | 0.50 |
| Diphenyl Guanidine | 0.35 | 0.35 | 0.35 | 0.35 |
| Sulfur | 1.30 | 1.30 | 1.30 | 1.30 |

Outdoor Dynamic Flexing (Kilocycles)

|  |  |  |  |  |
|---|---|---|---|---|
| VVS | 379 |  | 492 | 492 |
| VS | 1,705 |  | 1,705 | 1,705 |
| S |  |  |  |  |
| C | 3,554 |  | 3,327 | 3,559 |
| Condition at 3,500 Kc | C | OK | C | C |

Ozone Box (Hours)

|  |  |  |  |  |
|---|---|---|---|---|
| VVS | 32 |  | 144 |  |
| VS | 48 |  | 384 |  |
| S | 96 |  | 684 |  |
| C | 144 |  |  | 384 |
| Condition at 816 Hours | C | OK | S | C |

Outdoor Static Exposure (Days)

|  |  |  |  |  |
|---|---|---|---|---|
| VVS | 7 |  |  |  |
| VS | 14 |  |  |  |
| S |  |  |  |  |
| C |  |  |  |  |
| Condition at 26 Days | VS | OK | OK | OK |

It will be seen by inspection of Table 2, and by examination of FIG. 2 wherein a photograph of the dynamic flexing samples after 3500 kilocycles is shown, that the dicyclopentadiene EPDM stock 2-B is free of cracks while the control 2-A and the other EPDM stocks 2-C and 2-D are badly cracked (in fact, 2-C and 2-D are worse than the control 2-A). Exposure in the ozone box shows the dicyclopentadiene EPDM to give complete protection while the other EPDM polymers failed in the coverstrip.

It is particularly remarkable that this greatly improved cracking resistance is achieved while still maintaining satisfactory adhesion between the stocks, and to such stocks as conventional carcass and sidewall stocks.

Example 3

This example illustrates the practice of the invention with ethylene-propylene-dicyclopentadiene terpolymers having various viscosities, iodine numbers, and ethylene/propylene ratios. Four white sidewall stocks are prepared, in accordance with formulation 1-B in Example 1, based on 80 parts of natural rubber and 20 parts of dicyclopentadiene-EPDM's having the Mooney viscosities, iodine numbers, and ethylene/propylene ratios shown in Table 3. Similarly, four coverstrip stocks are prepared, in accordance with formulation 2-B of Example 2, using the four dicyclopentadiene-EPDM's shown in Table 3. The physical properties of the stocks after curing for various periods of time at a temperature of 350° F. are shown. Also, the results of aging tests, on samples cured 30 minutes at 350° F., are shown. Such tests include outdoor dynamic flexing and outdoor static exposure at Naugatuck, Connecticut, as well as an ozone box test (50 parts per hundred million of ozone, 12.5% elongation).

TABLE 3.—EFFECT OF VISCOSITY—IODINE NUMBER—ETHYLENE/PROPYLENE RATIO

| EPDM Properties | White Sidewall | | | | Coverstrip | | | |
|---|---|---|---|---|---|---|---|---|
|  | 3-A | 3-B | 3-C | 3-D | 3-E | 3-F | 3-G | 3-H |
| ML-4 at 212° F | 88 | 55 | 90 | 64 | 88 | 55 | 90 | 64 |
| Iodine No | 12.5 | 10 | 10 | 18 | 12.5 | 10 | 10 | 18 |
| E/P Ratio | 52/48 | 65/35 | 65/35 | 71/29 | 52/48 | 65/35 | 65/35 | 71/29 |
| 300% Modulus, p.s.i.: Cured at 350° F.: | | | | | | | | |
| 15 mins | 340 | 360 | 320 | 300 | 900 | 930 | 970 | 800 |
| 30 mins | 300 | 360 | 300 | 290 | 960 | 900 | 930 | 860 |
| 45 mins | 250 | 270 | 250 | 250 | 950 | 890 | 920 | 850 |
| Tensile Strength, p.s.i.: Cured at 350° F.: | | | | | | | | |
| 15 mins | 1,950 | 2,050 | 2,050 | 2,050 | 2,350 | 2,360 | 2,360 | 2,400 |
| 30 mins | 1,630 | 1,850 | 1,850 | 1,620 | 2,280 | 2,350 | 2,150 | 2,340 |
| 45 mins | 1,350 | 1,380 | 1,320 | 1,380 | 2,120 | 2,170 | 1,980 | 2,010 |
| Elongation, percent: Cured at 350° F.: | | | | | | | | |
| 15 mins | 710 | 710 | 740 | 740 | 550 | 550 | 510 | 540 |
| 30 mins | 750 | 770 | 750 | 740 | 500 | 530 | 500 | 520 |
| 45 mins | 790 | 780 | 770 | 780 | 500 | 500 | 480 | 480 |
| Outdoor Dynamic Flexing, Kilocycles to Crack Sample | 12,194 | 8,316 | 7,308 | 6,804 | All still OK after 13,664 days | | | |
| Outdoor Static Exposure | All still OK after 57 days | | | | All still OK after 57 days | | | |
| Ozone Box | All still OK after 1,000 hrs. | | | | All still OK after 1,000 hrs. | | | |

In the data of Table 3 it is noteworthy that the flex cracking life to the cracked stage is far above the 1913 kilocycles reported for the all natural rubber sidewall stock control 1-A previously described in Example 1, and that all stocks of Table 3 are free of ozone cracking after 1000 hours' exposure. The flex cracking life of the coverstrip stocks in Table 3 is far above the 3554 kilocycles reported for the control stock 2-A described in Example 2.

Example 4

Table 4 illustrates the invention wtih blends of dicyclopentadiene-type EPDM, NR and SBR (stocks 4-C and 4-D), in comparison to control stocks based on NR alone (stock 4-A) and NR-SBR blend (stock 4-B). The EPDM employed is the same as in stock 1-B of Example 1.

TABLE 4.—DICYCLOPENTADIENE EPDM BLENDS WITH NR/SBR—WHITE SIDEWALL STOCKS

|  | 4-A | 4-B | 4-C | 4-D |
|---|---|---|---|---|
| Natural Rubber | 100.00 | 75.00 | 65.00 | 55.00 |
| SBR 1551 |  | 25.00 | 15.00 | 25.00 |
| EPDM |  |  | 20.00 | 20.00 |
| Titanium Dioxide | 35.00 | 35.00 | 35.00 | 35.00 |
| Zinc Oxide | 35.00 | 35.00 | 35.00 | 35.00 |
| Stearic Acid | 2.00 | 2.00 | 2.00 | 2.00 |
| Wax (Sunproof Improved) | 5.00 | 5.00 | 5.00 | 5.00 |
| Processing Oil (Circo Light Oil) | 5.00 | 5.00 | 5.00 | 5.00 |
| N-Cyclohexyl-2-Benzothiazole Sulfenamide | 0.35 | 0.35 | 0.35 | 0.35 |
| Sulfur | 3.50 | 3.50 | 3.50 | 3.50 |
| 300% Modulus, p.s.i.: |  |  |  |  |
| Cured at 320° F.: |  |  |  |  |
| 15 mins | 300 | 300 | 330 | 310 |
| 30 mins | 230 | 360 | 350 | 360 |
| 60 mins | 200 | 320 | 300 | 300 |
| Tensile Strength, p.s.i.: |  |  |  |  |
| Cured at 320° F.: |  |  |  |  |
| 15 mins | 2,680 | 2,350 | 1,870 | 1,720 |
| 30 mins | 2,040 | 1,870 | 1,540 | 1,540 |
| 60 mins | 1,560 | 1,740 | 1,260 | 1,300 |
| Elongation, percent: |  |  |  |  |
| Cured at 320° F.: |  |  |  |  |
| 15 mins | 700 | 740 | 750 | 750 |
| 30 mins | 740 | 670 | 670 | 680 |
| 60 mins | 780 | 690 | 690 | 670 |
| Compounded ML-4 at 212° F | 31 | 35 | 34 | 34 |
| Tests on 30' Cure: |  |  |  |  |
| Outdoor Dynamic Flexing at Naugatuck, Kilocycles to C (Cracked). | 3,780 | 10,724 | 13,664 | 13,664 |
| Outdoor Static, Days | All still OK after 57 days |  |  |  |
| Ozone Box, Bent Loop, Hours (Total exposure 1,000 hours). | 427 (S) | 427 (VS) | OK | OK |

Example 5

In Table 5, stock 5-B represents the practice of the invention with a blend of dicyclopentadiene-ethylene-propylene terpolymer (described in Example 1 in connection with stock 1-B), polychloroprene rubber, chlorosulfonated polyethylene elastomer, and natural rubber. Stock 5-A of Table 5 is a control from which the EPDM has been omitted, for purposes of comparison.

TABLE 5.—DICYCLOPENTADIENE EPDM IN NR/NEOPRENE/CHLOROSULFONATED POLYETHYLENE BLENDS—WHITE SIDEWALLS

|  | 5-A | 5-B |
|---|---|---|
| Chlorosulfonated Polyethylene | 20.0 | 20.0 |
| Pale Crepe | 40.0 | 40.0 |
| Neoprene W | 40.0 | 20.0 |
| EPDM |  | 20.0 |
| Titanium Dioxide | 50.0 | 50.0 |
| Zinc Oxide | 50.0 | 50.0 |
| Stearic Acid | 1.0 | 1.0 |
| 2-benzothiazyl disulfide | 0.5 | 0.5 |
| 2-mercaptoimidazoline | 0.5 | 0.5 |
| Sulfur | 2.0 | 2.0 |
| 300% Modulus, p.s.i.: |  |  |
| Cured at 320° F.: |  |  |
| 15 mins | 860 | 790 |
| 30 mins | 1,060 | 860 |
| 60 mins | 1,060 | 920 |
| Tensile Strength, p.s.i.: |  |  |
| Cured at 320° F.: |  |  |
| 15 mins | 2,480 | 1,910 |
| 30 mins | 2,240 | 1,610 |
| 60 mins | 1,450 | 1,420 |
| Elongation, percent: |  |  |
| Cured at 320° F.: |  |  |
| 15 mins | 580 | 570 |
| 30 mins | 520 | 480 |
| 60 mins | 400 | 420 |
| Compounded ML-4 at 212° F | 49 | 55 |
| Tests on 30' Cure: |  |  |
| Outdoor Dynamic Flexing at Naugatuck, Kilocycles: |  |  |
| VVS | 1,764 | 3,780 |
| VS | 3,276 | 5,544 |
| S | 5,292 | 6,804 |
| C | 6,804 | 7,308 |
| Outdoor Dynamic Flexing at Los Angeles, Kilocycles: |  |  |
| VVS | 4,300 | 6,060 |
| VS | 8,060 |  |
| S | 8,980 |  |
| C |  |  |
| Outdoor Static | Still OK after 57 days |  |
| Ozone Box, Bent Loop 50 p.p.h.m. (Hours): |  |  |
| VVS |  | 54 |
| VS |  | 211 |
| S |  | 307 |
| C |  | 427 |
| Ozone Box, 12½ Elongation 50 p.p.h.m. (Hours): |  |  |
| VVS |  | 79 |
| VS |  | 307 |
| S |  | 663 |
| C |  | 759 |

(5-B ozone box columns: OK after 1,000 hours exposure)

It will be seen from Table 5 that stock 5-B of the invention gave greatly improved dynamic flexing and resistance to ozone cracking after 1000 hours' exposure.

Example 6

This example demonstrates the practice of the invention with polyisoprene as the conjugated diene elastomer, in both white sidewall stocks and coverstrip stocks, as shown in Table 6. Three EPDM's, described in Example 1, are employed. Stocks 6-B and 6-F made with the dicyclopentadiene EPDM, represent the invention. Stocks 6-A and 6-E are controls with no EPDM. Stocks 6-C and 6-G are outside the invention and use 1,4-hexadiene EPDM; similarly stocks 6-D and 6-H which use methylene norbornene EPDM are outside the invention. The superiority of stocks 6-B and 6-F is apparent from Table 6.

TABLE 6.—COMPARISON OF EPDM BLENDS CONTAINING POLYISOPRENE

|  | White Sidewall | | | | Black Coverstrip | | | |
|---|---|---|---|---|---|---|---|---|
|  | 6-A | 6-B | 6-C | 6-D | 6-E | 6-F | 6-G | 6-H |
| Polyisoprene Rubber (Natsyn 2200) | 100 | 80 | 80 | 80 | 50 | 50 | 50 | 50 |
| Dicyclopentadiene EPDM |  | 20 |  |  |  | 20 |  |  |
| 1,4-hexadiene EPDM |  |  | 20 |  |  |  | 20 |  |
| Methylene Norbornene EPDM |  |  |  | 20 |  |  |  | 20 |
| Neoprene W |  |  |  |  | 50 | 30 | 30 | 30 |
| Titanium Dioxide | 35 | 35 | 35 | 35 |  |  |  |  |
| Zinc Oxide | 35 | 35 | 35 | 35 | 3.5 | 3.5 | 3.5 | 3.5 |
| FEF Black |  |  |  |  | 25 | 25 | 25 | 25 |
| Stearic Acid | 2 | 2 | 2 | 2 | 2 | 2 | 2 | 2 |
| Light Processing Oil | 5 | 5 | 5 | 5 | 3 | 3 | 3 | 3 |
| Wax | 5 | 5 | 5 | 5 |  |  |  |  |
| 2-mercaptobenzothiazyl disulfide | 1.2 | 1.2 | 1.2 | 1.2 | 1.2 | 1.2 | 1.2 | 1.2 |
| Tetramethylthiuram disulfide | 0.3 | 0.3 | 0.3 | 0.3 | 0.3 | 0.3 | 0.3 | 0.3 |
| Sulfur | 3.5 | 3.5 | 3.5 | 3.5 | 1.3 | 1.3 | 1.3 | 1.3 |

TABLE 6.—COMPARISON OF EPDM BLENDS CONTAINING POLYISOPRENE—Con.

| | White Sidewall | | | | Black Coverstrip | | | |
|---|---|---|---|---|---|---|---|---|
| | 6-A | 6-B | 6-C | 6-D | 6-E | 6-F | 6-G | 6-H |
| 300% Modulus, p.s.i.: | | | | | | | | |
| Cured at 320° F.: | | | | | | | | |
| 15 mins | 300 | 280 | 190 | 300 | 590 | 630 | 650 | 630 |
| 30 mins | 300 | 300 | 190 | 300 | 810 | 790 | 990 | 830 |
| 60 mins | 250 | 290 | 190 | 290 | 900 | 900 | 950 | 990 |
| Tensile, p.s.i.: | | | | | | | | |
| Cured at 320° F.: | | | | | | | | |
| 15 mins | 2,300 | 450 | 2,000 | 800 | 2,750 | 2,300 | 2,180 | 2,200 |
| 30 mins | 2,400 | 600 | 1,690 | 750 | 3,150 | 2,390 | 2,230 | 2,390 |
| 60 mins | 1,850 | 400 | 1,550 | 550 | 3,350 | 2,220 | 2,300 | 2,100 |
| Elongation, percent: | | | | | | | | |
| Cured at 320° F.: | | | | | | | | |
| 15 mins | 680 | 430 | 870 | 530 | 710 | 640 | 620 | 610 |
| 30 mins | 720 | 480 | 920 | 500 | 660 | 700 | 550 | 570 |
| 60 mins | 710 | 400 | 980 | 480 | 630 | 540 | 520 | 490 |
| ML-4 at 212° F | 33 | 32 | 36 | 35 | 42 | 48 | 49 | 42 |
| Tests After 30′ Cure: | | | | | | | | |
| Outdoor Dynamic Flexing at Naugatuck, Kilocycles: | | | | | | | | |
| VVS | 1,512 | 1,512 | | 1,512 | 504 | 4,788 | 504 | 252 |
| VS | 1,764 | 2,520 | 1,512 | 1,764 | 3,276 | 6,804 | | 1,761 |
| S | 2,268 | 8,519 | 1,764 | 6,804 | 5,040 | 8,568 | | |
| C | 3,780 | 9,989 | 2,520 | 8,519 | 8,568 | 10,080 | 3,276 | 3,276 |
| Outdoor Dynamic Flexing at Los Angeles, Kilocycles: | | | | | | | | |
| VVS | 900 | 900 | 900 | | | | | |
| VS | 2,660 | 4,300 | 1,960 | | | | | |
| S | 3,400 | 6,060 | 2,660 | | | | | |
| C | 3,600 | 6,360 | 4,300 | 900 | | | | |
| Outdoor Static, Days: | | | | | | | | |
| VVS | 15 | OK | OK | OK | All OK after 27 days | | | |
| VS | 29 | | | | | | | |
| S | | | | | | | | |
| C | | | | | | | | |
| Ozone Box, Bent Loop, 50 p.p.h.m., 1,000 hrs. Total Exposure: | | | | | | | | |
| VVS | | | | | 88 | OK | 104 | 167 |
| VS | | | | | 126 | | 307 | 734 |
| S | | | | | 151 | | 379 | |
| C | | | | | 451 | | 499 | |
| Ozone Box, 12½% Elongation, 50 p.p.h.m., 1,000 hrs. Total Exposure: | | | | | | | | |
| VVS | 2 | OK | 2 | 2 | 130 | OK | OK | OK |
| VS | 1,000 | | 54 | 54 | 351 | | | |
| S | | | 251 | 251 | 734 | | | |
| C | | | 1,000 | 519 | 830 | | | |

Example 7

Example 6 is repeated, with a different commercially available polyisoprene, using the formulation shown in Table 7. The superiority of stocks 7-B and 7-F of the invention is apparent from the data in Table 7.

TABLE 7.—COMPARISON OF EPDM BLENDS CONTAINING POLYISOPRENE (SHELL ISOPRENE)

| | White Sidewall | | | | Black Coverstrip | | | |
|---|---|---|---|---|---|---|---|---|
| | 7-A | 7-B | 7-C | 7-D | 7-E | 7-F | 7-G | 7-H |
| Polyisoprene (Shell Isoprene) | 100 | 80 | 80 | 80 | 50 | 50 | 50 | 50 |
| Dicyclopentadiene EPDM | | 20 | | | | 20 | | |
| 1,4-hexadiene EPDM | | | 20 | | | | 20 | |
| Methylene Norbornene EPDM | | | | 20 | | | | 20 |
| Neoprene W | | | | | 50 | 30 | 30 | 30 |
| Titanium Dioxide | 35 | 35 | 35 | 35 | | | | |
| Zinc Oxide | 35 | 35 | 35 | 35 | 3.5 | 3.5 | 3.5 | 3.5 |
| FEF Black | | | | | 25 | 25 | 25 | 25 |
| Stearic Acid | 2 | 2 | 2 | 2 | 2 | 2 | 2 | 2 |
| Circo Light Oil | 5 | 5 | 5 | 5 | 3 | 3 | 3 | 3 |
| Sunproof Improved Wax | 5 | 5 | 5 | 5 | | | | |
| 2-mercaptobenzothiazyl Disulfide | 0.7 | 0.7 | 0.7 | 0.7 | | | | |
| Diphenyl Guanidine | 0.3 | 0.3 | 0.3 | 0.3 | 0.35 | 0.35 | 0.35 | 0.35 |
| Tetramethyl Thiuram Monosulfide | 0.1 | 0.1 | 0.1 | 0.1 | | | | |
| N-Cyclohexyl-2-benzothiazole Sulfenamide | | | | | 0.6 | 0.6 | 0.6 | 0.6 |
| Sulfur | 1.5 | 1.5 | 1.5 | 1.5 | 2 | 2 | 2 | 2 |
| Outdoor Dynamic Flexing at Naugatuck, Kilocycles: | | | | | | | | |
| VVS | | | | | 1,512 | OK | 2,268 | 756 |
| VS | | | | | 4,788 | | 9,989 | 1,764 |
| S | | | | | 8,316 | | 12,194 | |
| C | | | | | 8,519 | | | 4,788 |
| Outdoor Dynamic Flexing at Los Angeles, Kilocycles: | | | | | | | | |
| VVS | 900 | 900 | 900 | 900 | | | | |
| VS | 1,960 | 3,160 | 1,300 | 3,400 | | | | |
| S | | 4,800 | 1,960 | 4,800 | | | | |
| C | 2,660 | 6,060 | 4,300 | 5,060 | | | | |
| Outdoor Static, Days: | | | | | | | | |
| VVS | 57 | OK | OK | OK | 18 | OK | 28 | OK |
| VS | | | | | | | | |
| S | | | | | | | | |
| C | | | | | | | | |
| Ozone Box, Bent Loop 50 p.p.h.m., 1,000 hrs. Total Exposure: | | | | | | | | |
| VVS | 2 | 12 | 28 | 12 | 16 | 375 | 4 | 2 |
| VS | 203 | | 203 | 203 | 159 | | 48 | 48 |
| S | 419 | | 323 | 375 | 323 | | 74 | 54 |
| C | 515 | 775 | 419 | 679 | 375 | | 159 | 70 |
| Ozone Box, 12½% Elongation, 50 p.p.h.m., Total Exposure 1,000 hrs.: | | | | | | | | |
| VVS | 4 | OK | 183 | 4 | 20 | OK | 32 | OK |
| VS | | | | | 111 | | 111 | |
| S | | | | | 159 | | 159 | |
| C | | | | | 371 | | 203 | |

Example 8

Example 7 is repeated, using the formulation shown in Table 8, with the results indicated.

TABLE 8.—COMPARISON OF EPDM BLENDS CONTAINING POLYISOPRENE

|  | White Sidewalls | | | | Black Coverstrip | | | |
| --- | --- | --- | --- | --- | --- | --- | --- | --- |
|  | 8-A | 8-B | 8-C | 8-D | 8-E | 8-F | 8-G | 8-H |
| Polyisoprene (Shell Isoprene) | 100 | 80 | 80 | 80 | 50 | 50 | 50 | 50 |
| Dicyclopentadiene EPDM |  | 20 |  |  |  | 20 |  |  |
| 1,4-hexadiene EPDM |  |  | 20 |  |  |  | 20 |  |
| Methylene Norbornene EPDM |  |  |  | 20 |  |  |  | 20 |
| Neoprene W |  |  |  |  | 50 | 30 | 30 | 30 |
| Titanium Dioxide | 35 | 35 | 35 | 35 |  |  |  |  |
| Zinc Oxide | 35 | 35 | 35 | 35 |  |  |  |  |
| FEF Black |  |  |  |  | 25 | 25 | 25 | 25 |
| Stearic Acid | 2 | 2 | 2 | 2 | 2 | 2 | 2 | 2 |
| Circo Light Oil | 5 | 5 | 5 | 5 | 3 | 3 | 3 | 3 |
| Sunproof Improved Wax | 5 | 5 | 5 | 5 |  |  |  |  |
| N-Cyclohexyl-2-benzothiazole Sulfenamide | 0.35 | 0.35 | 0.35 | 0.35 |  |  |  |  |
| 2-mercaptobenzothiazole Disulfide |  |  |  |  | 0.5 | 0.5 | 0.5 | 0.5 |
| Diphenyl Guanidine |  |  |  |  | 0.35 | 0.35 | 0.35 | 0.35 |
| Sulfur | 3.5 | 3.5 | 3.5 | 3.5 | 1.3 | 1.3 | 1.3 | 1.3 |
| Outdoor Dynamic Flexing at Naugatuck, Kilocycles: |  |  |  |  |  |  |  |  |
| VVS | 744 | 1,671 | 744 | 744 |  | 3,327 | 492 | 492 |
| VS | 1,671 | 1,913 | 1,671 | 1,671 | 1,705 |  | 1,705 | 739 |
| S |  |  |  |  |  |  | 3,327 | 3,327 |
| C | 1,913 |  | 1,913 | 1,913 | 3,559 |  | 3,559 | 3,559 |
| Outdoor Static, Days: |  |  |  |  |  |  |  |  |
| VVS | 7 | OK | OK | OK |  |  |  |  |
| VS |  |  |  |  |  |  |  |  |
| S |  |  |  |  |  |  |  |  |
| C | 29 |  |  |  |  |  |  |  |
| Ozone Box, Bent Loop, 50 p.p.h.m.: |  |  |  |  |  |  |  |  |
| VVS |  |  |  |  | 6 | OK | 4 | 4 |
| VS |  |  |  |  | 96 |  | 48 | 8 |
| S |  |  |  |  | 384 |  | 72 | 24 |
| C |  |  |  |  | 648 |  | 96 | 32 |
|  |  |  |  |  | Total exposure 816 Hours | | | |
| Ozone Box, 12½ Elongation, 50 p.p.h.m.: |  |  |  |  |  |  |  |  |
| VVS | 2 | OK | 4 | 8 | 48 | OK | 144 | 144 |
| VS | 4 |  | 8 | 18 | 144 |  |  |  |
| S | 6 |  | 10 | 180 |  |  |  |  |
| C | 8 |  | 14 | 468 | 384 |  | 384 | 384 |

In the case of black sidewall tires the coverstrip composition may of course constitute the entire sidewall of the tire, or the coverstrip composition may be applied as a thin veneer over a conventional black sidewall composition.

Having thus described my invention, what I claim and desire to protect by Letters Patent is:

1. A pneumatic tire having a coverstrip made of a composition comprising, in 100 parts by weight of elastomers, from 15 to 35 parts by weight of ethylene-propylene-dicyclopentadiene terpolymer rubber, containing from 45 to 70% combined ethylene, from 30 to 55% combined propylene, and from 2 to 12.5% of combined dicyclopentadiene, from 15 to 35 parts by weight of polychloroprene rubber and from 40 to 60 parts by weight of another elastomer which is natural rubber, or butadiene-styrene copolymer rubber, the said composition containing 20 to 30 parts by weight of carbon black per 100 parts by weight of elastomers, and the said composition. being devoid of added antiozonant.

2. A pneumatic tire as in claim 1 in which the other elastomer is natural rubber.

References Cited

UNITED STATES PATENTS

| 2,894,926 | 7/1959 | Jacobson | 260—890 |
| 3,356,764 | 12/1967 | Gentile | 260—4 |
| 2,729,608 | 1/1956 | Strain | 260—5 |
| 3,200,174 | 8/1965 | Adamek et al. | 260—989 |
| 3,224,985 | 12/1965 | Gladding et al. | 260—5 |
| 3,278,480 | 11/1966 | Radcliff et al. | 260—41 |
| 3,311,151 | 3/1967 | Willis et al. | 260—889 |
| 3,331,793 | 7/1967 | Souffie | 260—4 |

OTHER REFERENCES

Technical Report on "Nordel" DuPont Co., Elastomer/Chemicals Dept., 1964, p. 67.

MURRAY TILLMAN, Primary Examiner.

M. J. TULLY, Assistant Examiner.

U.S. Cl. X.R.

152—353; 260—4, 5, 33.6, 41.5, 889, 890, 894, 897